Aug. 18, 1931. J. R. GEORGE Re. 18,152

APPARATUS FOR COOLING AND ANNEALING METAL BARS

Original Filed Dec. 1, 1924 2 Sheets-Sheet 1

Inventor:
Jerome R. George
By Attorney
Geo. H. Kennedy Jr.

Aug. 18, 1931. J. R. GEORGE Re. 18,152
APPARATUS FOR COOLING AND ANNEALING METAL BARS
Original Filed Dec. 1, 1924 2 Sheets-Sheet 2
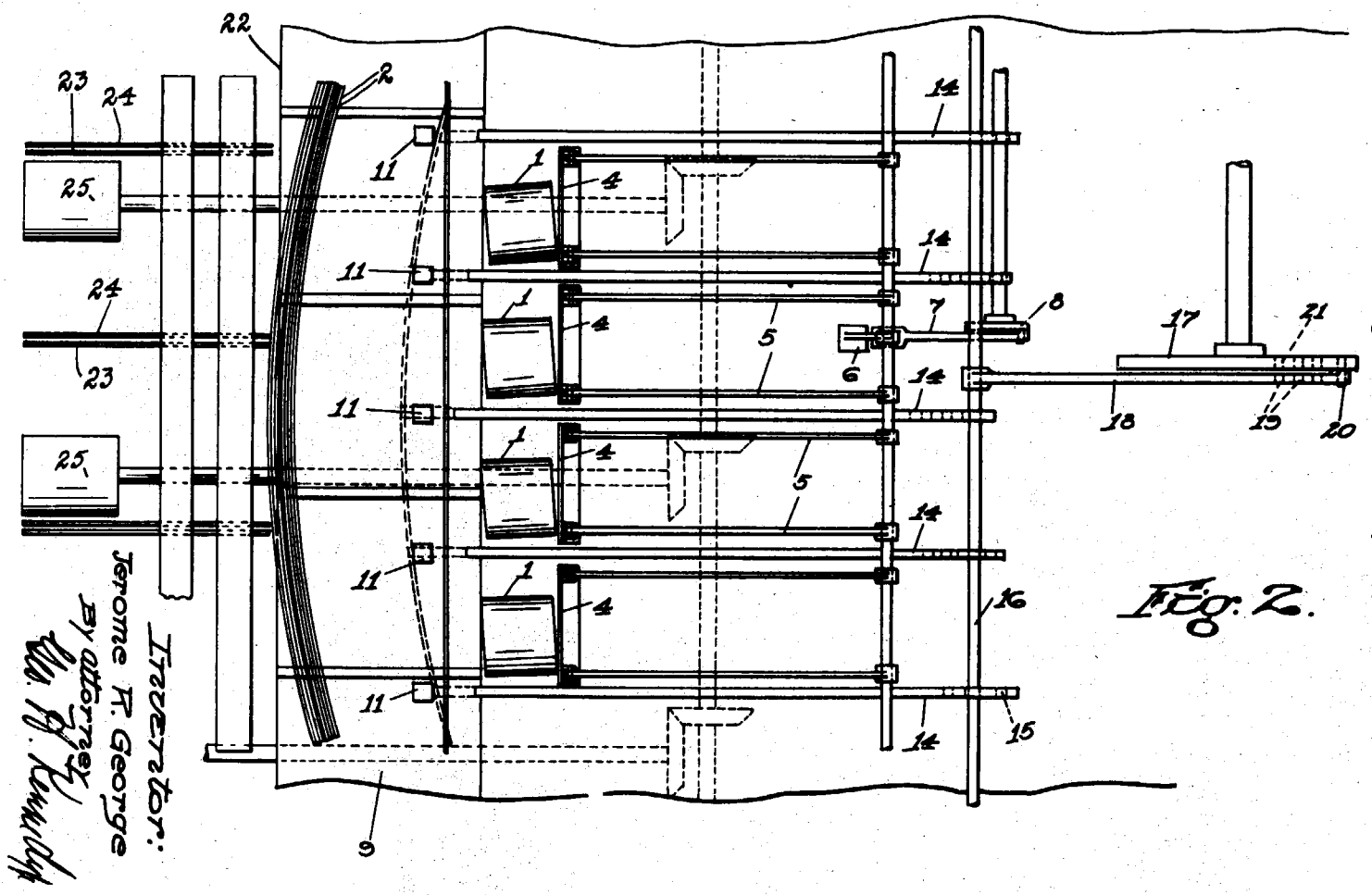

Reissued Aug. 18, 1931

Re. 18,152

UNITED STATES PATENT OFFICE

JEROME R. GEORGE, OF WORCESTER, MASSACHUSETTS, ASSIGNOR TO MORGAN CONSTRUCTION COMPANY, OF WORCESTER, MASSACHUSETTS, A CORPORATION OF MASSACHUSETTS

APPARATUS FOR COOLING AND ANNEALING METAL BARS

Original No. 1,642,437, dated September 13, 1927, Serial No. 753,241, filed December 1, 1924. Application for reissue filed February 19, 1931. Serial No. 517,086.

The present invention relates to the handling of hot metal bars as they emerge from a rolling mill, preparatory to the delivery of the same to shearing devices, or other mechanism, for operating on said bars. The invention applies particularly to the handling of rolled stock of flat cross section, such as used in the manufacture of springs, and contemplates among other things, the mechanical assemblage of such stock on edge, upon a cooling bed, in a continuous pack or pile, in order to secure self-annealing and slow cooling by the well known pack method. Other and further objects of the invention will be apparent from the following description thereof, reference being had in this connection to the accompanying drawings, wherein—

Fig. 2 is a plan view of the mechanism shown in Fig. 1.

Like reference characters refer to like parts in the different figures.

Figures 1, 3:
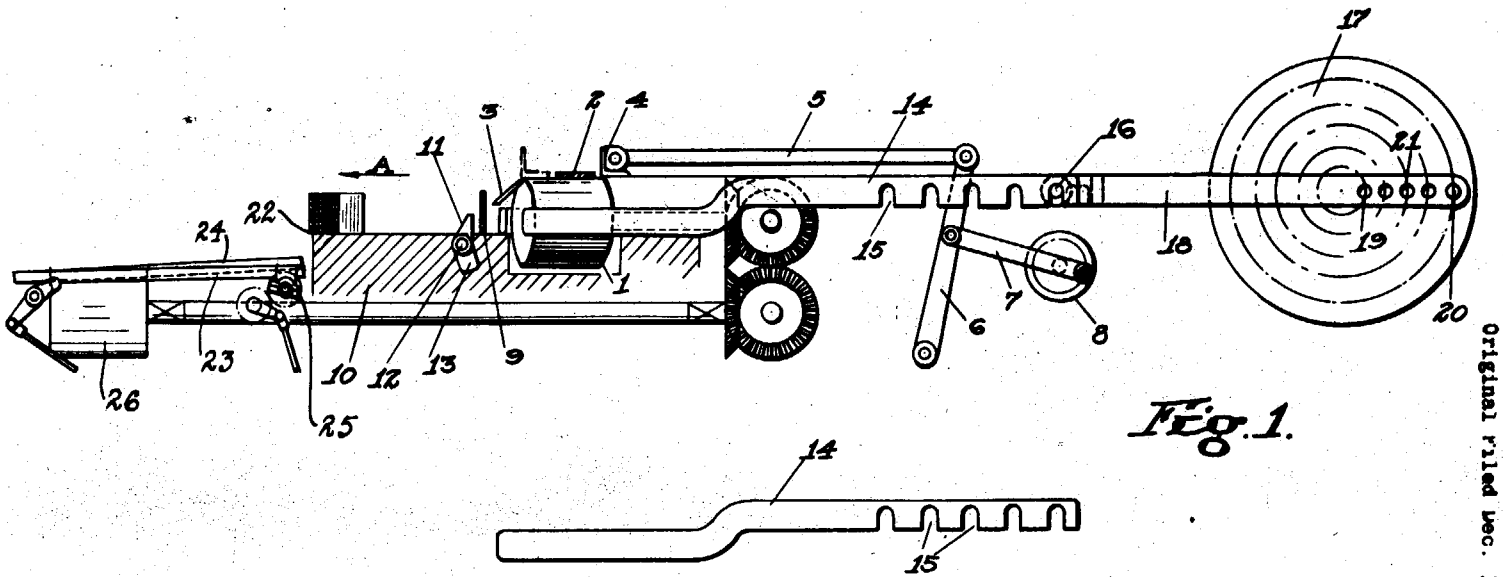
Fig. 1 is a view in side elevation, partly in section, showing mechanism embodying the invention.
Fig. 3 is an enlarged view of one of the pusher bars used in connection with the movement of the material across the cooling bed.

Referring to the drawings, there is shown a series of conveyor rolls 1, 1, the same constituting, for example, the hot runout of a rolling mill, not shown, which may be operated for the production of successive elongated bars or flat cross section, as indicated at 2. According to the invention, the bars 2, 2, as run out successively on the rolls 1, 1, are to be shifted broadside from said rolls onto a downwardly inclined guide surface 3, for gravity movement, broadside, down said incline. Any suitable means may be provided for moving the bars broadside off the rolls 1, 1; as here shown, said rolls 1, 1, are skewed, and the effect of this is to bring each bar into edgewise contact throughout its length with a series of alined straight edged pushers 4, 4, alternating with the several rollers 1, 1.

During the runout of each bar 2, these pushers 4, 4, are stationary and occupy the retracted position shown in full lines in Fig. 1. The several pushers are connected together for movement in unison, being here shown for this purpose as attached by links 5, 5, to a swinging member 6, which is oscillated at intervals by its connection, through rod 7, to a crank disk 8. With each delivery of a bar 2 from the mill into edgewise contact with the retracted straight edges 4, 4, the crank disk 8 is given one complete revolution, which serves to move the straight edges from the full to the dotted line positions shown in Fig. 1, and back again,—this action pushing the bar 2 broadside off of the rolls 1, 1, and returning the straight edges to retracted position, in readiness for action on the next succeeding bar 2.

Each bar 2 thus moved broadside across the rolls 1, 1, is discharged by this movement onto the downwardly inclined guide surface 3, the bar sliding by gravity across said surface 3 and then dropping broadside off said surface until its advancing longitudinal edge strikes the horizontal surface 9, forming part of a cooling bed 10 of any desired construction. By this movement each bar 2 arrives at the cooling bed surface 9 with its cross section in a substantially vertical position, the contact with said surface 9 being edgewise, and the bar being prevented from assuming a flat position by the lower edge of the inclined surface 3, which prevents tipping in one direction, and by the presence on the other side of a series of fingers 11, which prevent tipping in the other direction.

As illustrated in Fig. 1, each finger 11 is in the form of a bell crank lever pivotally mounted below the surface 9 on a pin 12, the lower portion of each lever being weighted, as shown at 13, so that the other portion extending above the surface 9 assumes a substantially upright position. The weighted portion 13 of each finger resists any deflection from said upright position, and consequently each finger serves effectually, normally, as a stop to prevent the successive bars 2, 2, supported edgewise, from tipping over,—said fingers 11, however, being subject, as hereinafter described, to depression, below the surface 9, in order to permit the movement of a bar or a group of bars across the cooling bed, when desired.

Each bar thus delivered to the surface 9, and supported edgewise thereon, is initially prevented from tipping over by the fingers 11 and by the lower edge of the inclined surface 3, but when said bar is shifted broadside in the direction of arrow A, Fig. 1, across the cooling bed 10, it soon moves beyond the influence of said restraining means, and consequently, in order to maintain the edgewise support that is essential to annealing and cooling by the pack method, the tendency of the material to tip over into a flat position must be overcome in some other way. This is done by mechanically imparting a bend or curve to each bar, so that instead of having a straight line contact with the supporting surface, the contact is of curved or waved form, thereby greatly increasing the stability of the edgewise supported bars. Moreover, according to the invention, this bending or curvature of the bars is effected by the selfsame pushing devices which, as hereinafter described, procure the broadside movement of the bars across the cooling bed 10, as follows:—

As herein shown, a series of pushers 14, 14, are disposed between the rollers 1, 1, their forward ends being supported on the surface 9, and their rear ends being provided with a series of notches 15, 15, Fig. 3, for the adjustable connection of said pushers to a common cross member 16. The latter is reciprocated from a crank disk 17 by means of a connecting rod 18, having a series of holes 19, 19, for selective connection to the crank pin 20 of disk 17, which crank pin also by means of holes 21, 21, in disk 17, may be adjusted. In this way, not only the location of the stroke, but also the length of the stroke, of the series of pushers 14 may be varied.

The pushers 14, by means of their notches 15, are so arranged that their effective lengths differ; that is to say, their forward ends, resting on the surface 9, are at different distances from the opposing face of the bar 2 supported edgewise on said surface. Consequently, as the crank disk 17 rotates, the pusher bars 14, actuated thereby in unison, will not all engage with the bar 2 at the same time; for instance, the central pusher 14, here shown as having the longest effective length will engage the bar 2 first, and will move through a considerable distance, in contact with the center of the bar, before any of the other pushers actually engage the bar.

In this way, the act of starting a bar on its travel across the cooling bed 10, by means of the pushers 14, 14, secures, simultaneously, the deflection of said bar, by which its stable edgewise support for the balance of said travel, is assured; this deflection, as shown in Fig. 2, is assisted by the action of such of the weighted fingers 11, as are remote from the longest pusher 14, since said fingers have sufficient resistance to prevent forward movement of adjacent portions of the bar until such portions are engaged by the shorter pushers 14. Consequently, when the whole bar 2 is finally pushed entirely beyond the yielding fingers 11, so as to permit the latter to return to their normal upright positions, said bar has acquired a curved or waved form and is thereby rendered self-supporting, edgewise, on the cooling bed 10.

As shown in Figs. 1 and 2, in the operation of the apparatus, pushers 14 are given a stroke sufficient in length to move each successive bar 2 substantially to a predetermined location near the end of bed 10,—this location being determined by the number of bars 2 which it is desired to accumulate in a pack at said end, for annealing by the well known pack method. Each successive bar added to the pack displaces the preceding bar, the latter being pushed forward each time a distance corresponding to the thickness of the added bar, until the pack finally reaches its maximum size when the first bar comes to the edge 22 of the bed 10. Thereafter, each addition of a bar 2 to the rear side of the pack results in the discharge of a bar from the front side of the pack, said discharging bar tipping over the edge 22 and falling flatwise on a suitable receiving means, here shown as a shuffle bar conveying mechanism of the type disclosed in my United States Letters Patent No. 1,359,163, dated November 16, 1920. Said shuffle bar conveying mechanism consists essentially of pairs of movable supporting bars 23, 24, the ends of which, by means of suitable eccentrics 25, are given a circular motion, with the bars 23 180° in advance of the bars 24, so as to produce a step-by-step movement for the material deposited thereon. Said conveying mechanism operates to deposit a plurality of bars 2 upon suitable conveyor rolls 26, 26, by which said bars 2 may be conveyed longitudinally to suitable mechanism, not shown, for shearing them in multiple into commercial lengths.

As will be apparent, the thickness of the pack of bars 2 on the cooling bed 10 may be varied by adjusting the stroke of the pushers 14, 14,—this being accomplished by changing the position of the crank pin 20 in the holes 21 of crank disk 17. A variation in the thickness of the pack produces a variation in the time that each bar remains in the pack, and this is of great importance in annealing by the pack method. Further control of this time element is afforded by changing the effective length of connecting rod 18, thereby changing the location reached by the ends of pushers 14, 14 on their forward stroke, and thus increasing or decreasing the thickness of the pack of bars, as the case may be; this also affords opportunity for varying the time during which each bar 2 remains in the pack.

The same result is obtainable by increasing or decreasing the effective lengths of the pushers 14 themselves by means of the notches 15 which engage with the cross member 16; in addition, these notches permit the requisite variation in length between adjacent pushers 14 which produces the above described bending or curving of the bars 2 on the cooling bed to render them self-supporting edgewise,—it being apparent that any desired degree of curvature or wave formation is obtainable through the adjustment afforded by these notches.

I claim:

1. In apparatus of the class described, a horizontal bed, means for delivering bars on edge to said bed, means for moving said bars broadside across said bed, means for curving said bars as they are moved across the bed, and means for controlling the number of bars on the bed at one time.

2. In apparatus of the class described, the combination with a support, of means for effecting the edgewise delivery to said support of successive bars which are normally incapable of standing edgewise, and means for distorting each bar while on said support to increase its stability on edge.

3. In apparatus of the class described, the combination with a support, of means for effecting the edgewise delivery to said support of a bar which is normally incapable of standing on edge, and means for increasing the edgewise stability of said bar while on said support by deflection thereof.

4. In apparatus of the class described, the combination with a support, of means for effecting the edgewise delivery to said support of a bar which is normally incapable of standing on edge, and means for imparting a curved form to said bar while on said support, by broadside movement of said bar, thereby to render it self-supporting on edge.

5. In apparatus of the class described, the combination with means for moving a bar longitudinally, of a support, means for effecting the broadside delivery of said bar on edge to said support, and means for moving said bar broadside on said support and at the same time giving it a wave-like form.

6. In apparatus of the class described, means for conveying a bar flatwise, means for delivering said bar broadside from said conveying means, thereby to support it on edge, and means for giving a wave-like form to said bar while on edge.

7. In apparatus of the class described, a horizontal bed, means for effecting the broadside delivery of a bar on edge to said bed, and means for giving a wave-like form to said bar while on edge.

8. In apparatus of the class described, a horizontal bed, means for effecting the edgewise delivery to said bed of a bar which is normally incapable of standing on edge, and means for increasing the edgewise stability of said bar while on said bed by lateral deflection thereof.

9. In apparatus of the class described, a horizontal bed, means for effecting the edgewise delivery to said bed of a bar that is normally incapable of standing on edge, and means for moving said bar broadside across said bed, said movement serving to deflect said bar to increase its stability while on edge.

10. In apparatus of the class described, a horizontal bed, means for successively effecting the broadside delivery of bars on edge to said bed, and means for moving said bars broadside across said bed, and said movement giving a wave-like form to each of said bars.

11. In apparatus of the class described, a horizontal bed, means for successively effecting the edgewise delivery to said bed of bars that are normally incapable of standing on edge, means for moving said bars broadside across said bed, and means for increasing the stability of each of said bars while on edge by lateral deflection thereof in advance of its movement across the bed.

12. In apparatus of the class described, means for imparting lateral deflection to successively delivered bars normally incapable of standing on edge, to increase their stability on edge, and means for moving a plurality of said bars, in nested relation, while supported on edge.

13. In apparatus of the class described, means for imparting lateral deflection to successively delivered bars normally incapable of standing on edge, to increase their stability on edge, means for disposing said bars, in nested relation, in a plurality of edgewise supported packs, and means for moving said packs broadside.

14. In apparatus of the class described, conveying means for moving metal bars longitudinally, a horizontal cooling bed for receiving said bars on edge from said conveying means, adjustable pushers for curving said bars and moving them laterally across said cooling bed to a predetermined position against a pack of preceding bars, which pack is thereby moved a distance equal to the thickness of one of said bars, said movement serving to separate the coldest bar from the front of said pack as each fresh bar is added to the rear of said pack.

15. In apparatus of the class described, a horizontal cooling bed to which the bars are delivered on edge, means for moving successively delivered bars broadside on edge across said bed, to form a pack, and conveying means onto which the first bar of said pack tips flatwise by gravity as each fresh bar is added to the other side of said pack.

16. In apparatus of the class described, a horizontal cooling bed to which bars are successively delivered on edge, pushers for moving said bars broadside on edge across said bed, to form a pack, and means for adjusting the stroke of said pushers, to vary the duration of each bar in said pack, prior to its discharge by gravity from the front of said pack.

17. In apparatus of the class described, a horizontal cooling bed to which bars are successively delivered on edge, pushers for moving said bars broadside on edge across said bed, to form a pack, and means for adjusting said pushers to vary the thickness of said pack, whereby to vary the time that each bar remains in said pack, prior to its discharge by gravity from the front of said pack.

18. The combination with a substantially horizontal cooling bed, of means for delivering broadside thereto on edge a succession of flat bars, pushers operative on each bar so delivered to move the same broadside on edge across said bed into pack formation with preceding bars so delivered and moved, and conveying means onto which the first of the so-packed bars tips flatwise as each fresh bar is added by said pushers to the other side of said pack.

19. The combination with a substantially horizontal cooling bed, of means for delivering on edge thereto a succession of flat bars, pushing means operative on each bar so delivered to move the same broadside on edge across said bed into pack formation with preceding bars so delivered and moved, and means yieldable to the movement of each bar by said pushing means for opposing tipping of the bars from their edgewise delivery positions.

JEROME R. GEORGE.